(12) United States Patent
D'Addetta et al.

(10) Patent No.: US 9,156,421 B2
(45) Date of Patent: Oct. 13, 2015

(54) METHOD AND CONTROL UNIT FOR CONTROLLING AN OCCUPANT PROTECTION MEANS OF A VEHICLE

(71) Applicants: Gian Antonio D'Addetta, Stuttgart (DE); Marielle Cuvillier, Stuttgart (DE); Thomas Lich, Schwaikheim (DE); Christian Korn, Stuttgart (DE); Stephan Rittler, Urbach (DE); Josef Kolatschek, Weil der Stadt (DE)

(72) Inventors: Gian Antonio D'Addetta, Stuttgart (DE); Marielle Cuvillier, Stuttgart (DE); Thomas Lich, Schwaikheim (DE); Christian Korn, Stuttgart (DE); Stephan Rittler, Urbach (DE); Josef Kolatschek, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/363,207

(22) PCT Filed: Dec. 3, 2012

(86) PCT No.: PCT/EP2012/074231
§ 371 (c)(1),
(2) Date: Jun. 5, 2014

(87) PCT Pub. No.: WO2013/083516
PCT Pub. Date: Jun. 13, 2013

(65) Prior Publication Data
US 2014/0350797 A1 Nov. 27, 2014

(30) Foreign Application Priority Data

Dec. 5, 2011 (DE) .......................... 10 2011 087 698

(51) Int. Cl.
*B60R 21/0132* (2006.01)
*B60R 22/48* (2006.01)
*B60R 21/013* (2006.01)
*B60R 21/01* (2006.01)

(52) U.S. Cl.
CPC ........... *B60R 21/0132* (2013.01); *B60R 21/013* (2013.01); *B60R 22/48* (2013.01); *B60R 2021/01225* (2013.01)

(58) Field of Classification Search
CPC ..................... B60R 2021/01225; B60R 22/48; B60R 21/0132; B60R 21/013
USPC .......................................................... 701/45
See application file for complete search history.

(56) References Cited

U.S. PATENT DOCUMENTS

| | | | | |
|---|---|---|---|---|
| 2005/0017488 A1* | 1/2005 | Breed et al. | ................... | 280/735 |
| 2005/0248136 A1* | 11/2005 | Breed et al. | ................... | 280/735 |
| 2006/0001252 A1* | 1/2006 | Bostrom et al. | ............. | 280/804 |
| 2006/0052924 A1* | 3/2006 | Prakah-Asante et al. | ....... | 701/45 |
| 2007/0228703 A1* | 10/2007 | Breed | ........................... | 280/735 |
| 2007/0228704 A1* | 10/2007 | Cuddihy et al. | .............. | 280/735 |
| 2008/0238057 A1* | 10/2008 | Inoue et al. | ................... | 280/735 |

FOREIGN PATENT DOCUMENTS

| | | |
|---|---|---|
| DE | 102007015768 | 10/2007 |
| DE | 602005001169 | 4/2008 |
| DE | 102008016094 | 10/2008 |
| DE | 102008005159 | 7/2009 |

OTHER PUBLICATIONS

International Search Report for PCT/EP2012/074231, issued on Mar. 5, 2013.

* cited by examiner

*Primary Examiner* — Mary Cheung
*Assistant Examiner* — Anne Mazzara
(74) *Attorney, Agent, or Firm* — Kenyon & Kenyon LLP

(57) ABSTRACT

A method is described for controlling an occupant protection arrangement which has at least two levels of protection for an occupant of a vehicle. The method has a step of selecting one of the at least two levels of protection of the occupant protection means as the level of protection to be used in the event of an impact of the vehicle using a yaw direction of the vehicle.

10 Claims, 6 Drawing Sheets

METHOD AND CONTROL UNIT FOR CONTROLLING AN OCCUPANT PROTECTION MEANS OF A VEHICLE

FIELD OF THE INVENTION

The present invention relates to a method for controlling an occupant protection means which has at least two levels of protection for an occupant of a vehicle, to a corresponding control unit and to a corresponding computer program product.

BACKGROUND INFORMATION

When controlling a conventional restraint device, acceleration values in the direction of the longitudinal axis of a vehicle are evaluated and the restraint device is controlled accordingly.

German Patent No. 60 2005 001 669 describes a corresponding method for controlling a restraint device in a vehicle.

SUMMARY

Against this background, the present invention provides a method for controlling an occupant protection means which has at least two levels of protection for an occupant of a vehicle, in addition to a control unit which employs this method and finally a corresponding computer program product.

Typically, the focus of existing safety systems is concentrated on the front seat passengers, in particular because this is tested in typical crash test scenarios. However, increasing attention is being devoted to the safety of the rear-seat passengers, for example, using beltbag technology. Other designs for the safety of rear-seat passengers include, for example, intermediate airbags. Present changes with regard to rear-seat passengers are also incorporated in present consumer protection tests. Starting in 2015 a Q10+ dummy, in addition to a Q6 dummy with child car seat, will be tested in the back seat at Euro NCAP. Since in this case no child car seat is employed, the on-board safety system for protecting the adolescent will be used.

Accident research analyses based on the GIDAS database show that in 12% of all accidents involving injuries, at least one occupant is seated in the rear seat area. In most cases it is the right rear seat (51%) which is usually occupied, otherwise, the left (41%) and less often the middle seat (8%). All totaled, barely 30% of the rear seat occupants in these cases are younger than 12 years of age. On the whole, the accident research analyses clearly show that the individual kinematics of the occupants should be more highly restricted as compared to front seat passengers, in order to avoid serious injuries. Results of 40% of ODB crashes with the aid of occupant simulation illustrate that the left and the right rear seat passengers exhibit quite different kinematics depending on the direction of rotation of the vehicle.

During a vehicle accident with a vehicle rotation about the vertical axis of the vehicle, the vehicle occupants are subject to lateral acceleration forces. Depending on a direction of the vehicle rotation, at least vehicle occupants sitting on the outside are flung either in the direction of the vehicle interior or in the direction of a vehicle side wall or vehicle door. A relatively long path is available in the direction of the vehicle interior over which the movement of the occupant relative to the vehicle may be slowed with the aid of a restraint device.

For this reason, it is possible to restrain the occupant with minimal restraining forces due to the restraint device. A relatively short path is available in the direction of the side wall or door over which the movement may be slowed, before the occupant hits the side wall or door. During a movement in the direction of the side wall or door, therefore, it makes sense to slow the occupant by a restraint device having greater restraining forces. The different restraining forces may be implemented by different levels of protection of an occupant protection system which includes at least one restraint device. Thus, a low level of protection may mean a low restraining force and a high level of protection may mean a high restraining force. By analyzing the direction of rotation of the vehicle, it is initially possible to determine the required restraining force. Based on this, a suitable level of protection of the occupant protection system may be selected.

A method for controlling an occupant protection means which has at least two levels of protection for an occupant of a vehicle includes the following step:

Selecting one of the at least two levels of protection of the occupant protection means as the level of protection to be used in the event of an impact of the vehicle using a yaw direction of the vehicle.

The vehicle may be a motor vehicle, for example, a passenger car. An occupant protection means may be understood to mean, for example, an airbag or a seat belt. One level of protection may, for example, be a fill level of an airbag or a retention force of a seat belt. The level of protection may be used to define with which restraining force the occupant is prevented by the occupant protection means from leaving his sitting position. The yaw direction may indicate a direction of turning or rotation of the vehicle. The turning or rotation may be caused by the impact of the vehicle. A yaw direction may be ascertained using a yaw rate of the vehicle. The yaw rate may be detected with the aid of a yaw rate sensor. The impact of the vehicle may be detected using suitable sensor systems. The detected impact may be signaled with the aid of an impact signal. The step of selecting may be carried out in response to a detection of an impact or independently of the detection of the impact. In the step of selecting, a piece of information about movement space available for the occupant may be taken into account. The occupant may, in particular, be an occupant situated in the rear seat area of the vehicle. Accordingly, the occupant protection means may be an occupant protection means situated in the rear seat area. The occupant protection means may, for example, be a restraint system, an airbag or an energy-absorbing element, for example, on an interior trim of the vehicle. When triggering the occupant protection means, the occupant protection means may be triggered with the level of protection triggered in the step of selecting.

In addition, the level of protection to be used may also be selected using a movement space available for the occupant. For this purpose, a position of the occupant may initially be detected by an evaluation of signals from sensors, for example, from seat occupancy sensors. The movement space available for the occupant may be determined with the aid of a step of ascertaining using the yaw direction and the position of the occupant. In addition, the movement space available may be determined based on the dimensions of an interior of the vehicle. The movement space available for an individual or for all vehicle seats of the vehicle may be predetermined for a clockwise direction of rotation of the vehicle and additionally or alternatively for a counterclockwise direction of rotation. For example, during a clockwise rotation of the vehicle an occupant in the left rear seat in the vehicle may have more movement space than an occupant in the right rear seat in the vehicle, since an outer boundary of a passenger cell of the vehicle is situated to the right next to the right rear seat, i.e., a side wall, a door or a window, for example. The occupant in the left rear seat in this exemplary situation has movement space in the direction of the center of the vehicle.

The available movement space may be ascertained using a piece of information about the occupant. A piece of information about the occupant may be understood to mean, for example, a body size of the occupant. For example, a tall occupant with the upper body displaced forward may be more likely to strike against an object situated in front of the occupant such as, for example, a seat than a short occupant. In general, a tall occupant may also have less movement space than a short occupant. The piece of information about the occupant may be captured, for example, by a camera in the interior of the vehicle or by a sensor in the seat of the vehicle or by a weight-detecting system in the seat or by a seat belt retractor sensor in the seat belt mechanism.

The method may include a step of detecting a type of protection of the occupant, the movement space available being ascertained using the type of protection. A type of protection may be understood to mean an aid for securing the occupant to the seat. For example, use of a child car seat may restrict the availability of restraint means. In addition, the movement space may be restricted by a child car seat. The type of protection may be detected with the aid of a sensor, for example, in the seat.

A higher level of the levels of protection may be selected as the level of protection to be used if the movement space is smaller than a minimum value. If, in contrast, the available movement space is greater than the minimum value, a lower level of the levels of protection may then be selected. If a lower level of protection is selected, the individual movement of the occupant may be reduced using less force, but over a greater path length and, thus, the load acting on the occupant is reduced. The higher level of protection may be linked to a greater restraint force than the lower level of the levels of protection. For example, a higher belt load may be selected on a restraint belt as a result of a higher level of protection than in the case of a lower level of protection. The higher belt load may immediately absorb a movement of the occupant so that an impact of the occupant against a part of the vehicle may be avoided or at least greatly mitigated to the extent possible.

The method may also include a step of reading in at least one piece of information about the occupant. In the step of selecting, the level of protection to be used may also be ascertained using the piece of information about the occupant. The piece of information about the occupant may, for example, be read from a memory. The piece of information about the occupant may, for example, include a body weight, a body size, a state of health, such as bone density, an age and/or a gender of the occupant. For example, an occupant of advanced age may tolerate lower restraint forces than an occupant of younger age.

The level of protection to be used may also be selected using a yaw angle of the vehicle. A yaw angle may represent how far a vehicle has rotated starting from an original direction of travel. The yaw angle may be ascertained in a step of ascertaining the yaw angle using the yaw rate. The yaw angle may be used to detect whether, for example, the vehicle has carried out an actual movement. The vehicle may carry out only a minimal movement if a high acceleration is operative for only a short period of time. In this case, this may result in minimal movements of the occupant which do not necessitate the engagement of the occupant protection system.

The occupant protection means may be a restraint belt and/or a seat and/or a restraint system integrated into the seat and/or an energy-absorbing interior body and/or an energy-absorbing panel and/or an airbag, in particular in the rear seat area of the vehicle. The at least two levels of protection may represent at least two different levels of tensile force of the restraint belt. A restraint belt may also include several levels. The restraint belt may also be infinitely adjusted. The belt may also be shortened counter to a movement of the occupant in order to slow the occupant more quickly. An airbag may denote not only both a curtain bag and a side bag, but also an intermediate air bag. Particularly extreme lateral accelerations may occur in the rear seat area of a vehicle when the vehicle carries out a rotation about the yaw axis.

The present invention also provides a control unit which is designed to carry out or implement the steps of the method according to the present invention in corresponding devices. With this embodiment variant of the present invention in the form of a control unit as well, the object underlying the present invention may be quickly and efficiently achieved.

A control unit in the present case may be understood to mean an electrical device which processes sensor signals and outputs control signals as a function thereof. The control unit may include an interface which may be designed in hardware and/or in software. In a hardware design, the interfaces may, for example, be part of a so-called system ASIC which contains a wide variety of functions of the control unit. It is also possible, however, for the interfaces to be dedicated, integrated circuits or to be made up at least partly of discrete components. In a software design, the interfaces may be software modules which are present, for example, on a microcontroller next to other software modules.

Also advantageous is a computer program product having program code which may be stored on a machine readable carrier, such as a semiconductor memory, a hard disk memory or an optical memory, and are used to carry out the method according to one of the specific embodiments described above when the program is executed on a computer or a device.

DETAILED DESCRIPTION

Figure 1A:
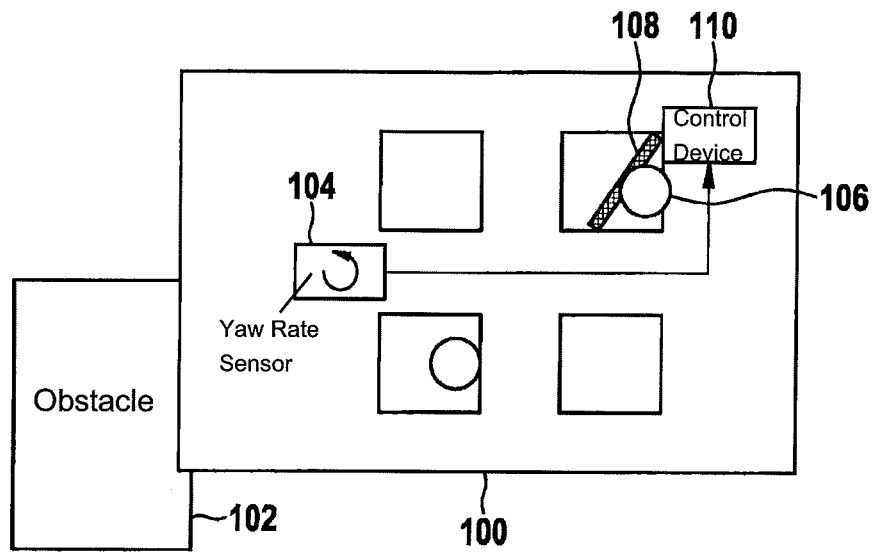
FIG. 1a shows a vehicle including a device according to one exemplary embodiment of the present invention.

In the following description of preferred exemplary embodiments of the present invention, identical or similar reference numerals are used for elements which are similarly operative and represented in the various figures, whereby a repeated description of these elements is omitted.

FIG. 1a shows a vehicle 100 according to one exemplary embodiment of the present invention. Vehicle 100 is driving straight ahead and the front end thereof strikes an obstacle 102. As a result of the impact with obstacle 102, vehicle 100 is caused to rotate. A rate of rotation resulting therefrom, for example, about a vertical axis extending through the center of gravity of vehicle 100 may be detected with the aid of a yaw rate sensor 104.

The vehicle has four seats, for example. An occupant 106 is seated on a seat situated in the right rear. Occupant 106 is secured by an occupant protection means. The occupant protection means according to this exemplary embodiment is represented, for example, as a safety belt 108. A tensile force of safety belt 108 may be adjusted to at least two different values with the aid of a device 110 for controlling safety belt 108 and for actuating safety belt 108. Safety belt 108 may be actuated with the aid of a motor, pyrotechnics, a force limiter or other suitable means. Thus, the safety belt includes at least two different levels of protection.

Yaw rate sensor 104 is designed according to this exemplary embodiment to output a piece of information about the direction of rotation of vehicle 100 about the vertical axis to device 110. Device 110 is designed to select one of the levels of protection of safety belt 108 using the direction of rotation in response to the impact of vehicle 100 with obstacle 102.

Device 110 is representative of a control unit for controlling the occupant protection means. Device 110 may, for example, be an airbag control unit. The device may be situated at any suitable position in vehicle 100. For example, device 110 may be situated in the area in the center of the vehicle. Device 110 and yaw rate sensor 104 may also be situated in a shared housing.

According to one exemplary embodiment of the present invention, an adaptation of the belt systems of a vehicle is made possible, in particular an adaptation of the belt load limiter characteristics and the tightening force in motorized belt tensioners in the rear seat area as a function of the direction of rotation of vehicle 100, of the seat position or seat occupancy of the vehicle's rear seat and the other available occupant protection means such as, for example, side and head airbags. The adaptation may be carried out, in particular in the cases ranging from offset front crashes to low overlap vehicle-to-vehicle crashes, but also in the case of corresponding side crashes.

The yaw rate and the variables derived therefrom may be used in combination with a collision state, i.e., a status of collision of vehicle 100, for controlling the restraint means situated in the rear seat area. In addition to a belt system 108, these means also include airbags or reversible systems, e.g., in the seat or door structure.

Thus, in an advantageous manner, the belt load effect is, in the figurative sense, "added" or "subtracted" relative to the occupant movement and results in a stricter limitation of the momentum of occupant 106 and, therefore, in a lower risk of injury, in particular in the case of lateral movement.

For example, during a rotation of vehicle 100 to the left, i.e., a counterclockwise rotation, the left rear seat passenger has significantly less space available on the side for his individual movement than right rear seat passenger 106. In order to limit such kinematics, the belt load characteristics for the passenger sitting on the left are advantageously controlled at a higher level in coordinated control with the curtain bag and/or side bag and/or rear air bag and/or intermediate airbag between two passengers and/or protection systems integrated into the seat or additional restraint and safety systems for protecting rear seat passenger 106. In this way, the passenger sitting on the left optimally utilizes the usable movement space, the so-called ride down space. In contrast, a limitation in the case of right rear seat passenger 106 is unnecessary. The latter reduces his kinematic energy of the head and thorax over a longer path and therefore better utilizes the ride down space available.

In addition to the belt load limiter level, a switch may be made between constant, progressive and degressive chronological characteristics, or of characteristics which are a function of acceleration or forward displacement or rotational movement, insofar as this is used to increase the safety of the occupant by the effective influencing of individual kinematics. The progressive characteristics may define a rising force level and the degressive characteristics may define a declining force level. The belt tensioner, pyrotechnic or electromotive in design (EMR), may also be considered as a controllable part of belt system 108. In this case, the moment of triggering may be controlled as a function of the rotation of the vehicle or the variables derived therefrom (speed of rotation), and the electromotive characteristics may be influenced. An essential advantage of the approach presented here is the reduction in the severity of injury of rear seat passengers in the case of frontal crashes with offset, as occurs for example in the case of typical front end collisions or also head-on collisions.

In other words, the yaw rate as well as variables derived therefrom may be used in the trigger algorithm of the occupant protection means. On this basis, an improved crash classification may be made and therefore an adapted trigger strategy may be selected for the front seat area as well. The piece of information may be used for the actual triggering of the restraint means. Moreover, the piece of information may also be used after triggering of the restraint means, in particular with the focus on rear seat passengers.

If the rear seat area of the vehicle also includes a middle seat, then the basic concept described with reference to the two outer seats may also be implemented in a corresponding manner for the middle seat or for an occupant protection means provided for the middle seat.

Figure 1B:
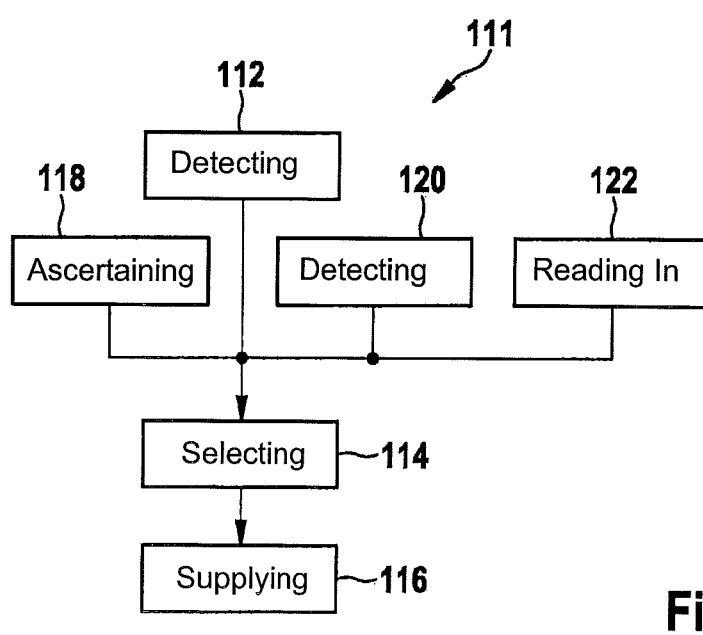
FIG. 1b shows a flow chart of a method for controlling an occupant protection means of a vehicle according to one exemplary embodiment of the present invention.

FIG. 1b shows a flow chart of a method 111 for controlling an occupant protection means of a vehicle according to one exemplary embodiment of the present invention. The vehicle may be vehicle 100 shown in Figure 1a and method 111 may be implemented by device 110 shown in FIG. 1a. Method 111 may be used to control an occupant protection means, for example, safety belt 108 shown in FIG. 1a, which has several levels of protection.

Method 111 of the occupant protection means includes a step of detecting 112, a step of selecting 114 and a step of supplying 116. Method 111 may be carried out in response to a detected collision of the vehicle.

In the step of detecting 112, a yaw rate of the vehicle is detected, for example, with the aid of a yaw rate sensor. The yaw rate represents a rotation about a vertical axis of the vehicle. In the step of selecting 114, one of at least two levels of protection of the occupant protection means is selected as the level of protection to be used during an impact of the vehicle using a yaw direction of the vehicle ascertained from the yaw rate. In the step of supplying 116, a signal is supplied to the occupant protection means which represents a piece of information about the level of protection to be used.

In addition, the method may include a step of ascertaining 118, a step of detecting 120 and a step of reading in 122.

In the step of ascertaining 118 a movement space available for the occupant may be ascertained, in which the occupant may move injury-free in the event of a collision of the vehicle. For example, the occupant may have more movement space in the direction of the center of the vehicle than in the direction of the vehicle side. In the step of selecting 114, the available movement space may be taken into account in order to select the level of protection to be used. In the step of detecting 120 a type of protection of the occupant may be detected.

For example, a state of the restraint means is detected via sensors on a restraint device. A child car seat or a baby seat may also be detected, for example. The piece of information about the type of protection may be used in the step of selecting 114 in order to select the level of protection to be used. In the step of reading in 122, at least one piece of information about the occupant may be read in. For example, an age or a weight of the occupant may be read in. In the step of selecting 114 the piece of information about the occupant may be used in order to select the level of protection to be used.

The steps of method 111 may be carried out by a control unit. For this purpose, the control unit may include a device for detecting, a device for selecting and a device for supplying. In addition, the control unit may include a device for ascertaining, a device for detecting and a device for reading in.

Figure 1C:
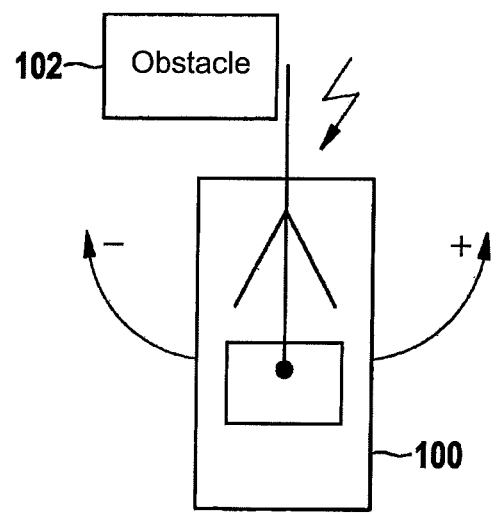
FIG. 1c shows a top view of a vehicle prior to an impact including a definition of a coordinate system.

FIG. 1c shows a simplified representation of a vehicle 100 before an impact with a barrier 102. Vehicle 100 strikes barrier 102 head-on. In the process, barrier 102 overlaps approximately half of a front of vehicle 100. Shown next to vehicle 100 are two direction of rotation arrows. A counterclockwise rotation is marked with "+," a clockwise rotation is marked with "−."

Figure 2:
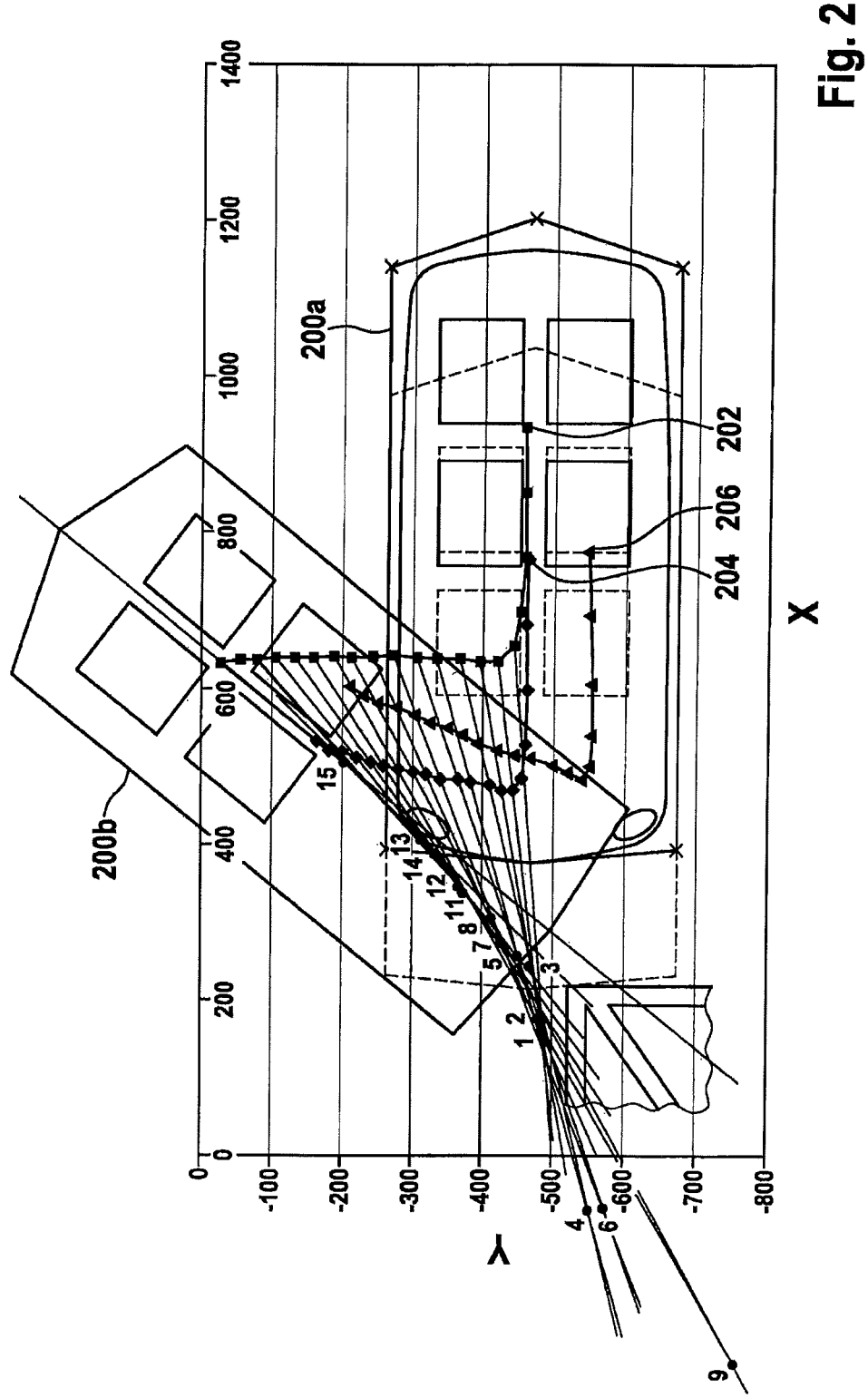
FIG. 2 shows a representation of a movement trajectory with resulting yaw movement of a vehicle after an ODB crash at 64 km/h.

FIG. 2 shows a movement trajectory of a vehicle in a standard 64 km/h offset crash. Shown is a superimposed representation of an image of a vehicle in the compact class, multiple stylized contour lines 200a, 200b of the vehicle and coordinate changes of several points 202, 204, 206 which are marked on the vehicle. The tracks of the coordinate changes are represented in a superimposed x-y diagram, the axes of which represent image point coordinates of a recording camera and bear no relation to the underlying vehicle.

Even a head-on crash results in significant vehicle rotations. The graphic shown is based on a single image analysis of a crash test video in a top view. Plotted among other things are contour 200a of the vehicle before the collision, contour 200b of the vehicle after the collision and three points 202, 204, 206 selected from the interior. Points 202, 204, 206 were selected on the basis of marker points in the video recording. Points 202, 204, 206 describe the coordinate system of the vehicle and therefore the instantaneous absolute rotation of the vehicle. Points 202, 204, 206 are situated on the roof of the vehicle in the area within or in the area of the passenger cell. Since no deformation occurs here due to the crumple zone concept and the stability of the passenger cell, the rectangular intersecting cross spanning points 202, 204, 206 remains rectangular. Two individual measuring points of the recording span 20 ms. The time duration (400 ms) covered by the measuring points entered in the figure does not correspond to the duration of the collision and is significantly shorter. From the course of the trajectories it is apparent that the vehicle has a very rigid vehicle structure and subsequently carries out an extreme, sudden rotation. This is an indication that in the second crash phase an extreme rotatory load and accompanying sideward movement of the occupant is to be expected. Also inherent in this is, of course, an increased risk of injury. Three points 202, 204, 206 move with the vehicle as the vehicle collides with the barrier. In this case, points 202, 204, 206 describe an approximately L-shaped trajectory.

Figure 3:
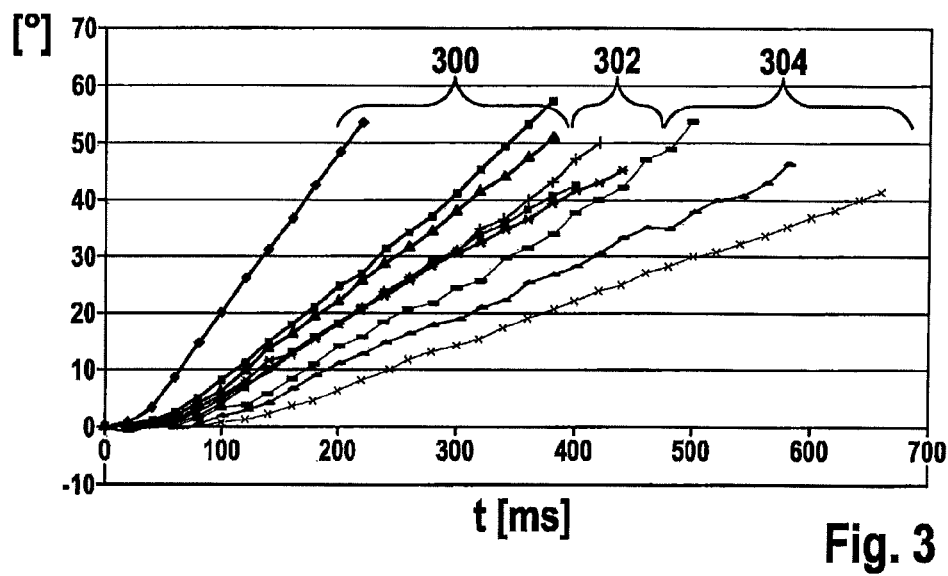
FIG. 3 shows a representation of rotation curves of various vehicles after an ODB crash at 64 km/h.

FIG. 3 shows several rotation curves as a function of the vehicle size and vehicle weight. In this case, the rotation curve of different vehicles in 64 km/h ODB crashes is shown, for example, based on an image analysis. A time t in ms is plotted on the abscissa. Plotted on the ordinate is a rotation angle as an angle with horizontals in degrees. Here, curves 300 describe mini and compact class vehicles, curves 302 describe midsize vehicles and curves 304 describe heavy vehicles. From this it is apparent that smaller vehicles, in particular due to the more rigid structural design of the vehicle previously mentioned in FIG. 2, are subject to extreme rotations. A typical hybrid vehicle with a relatively heavy battery in the rear area behaves similarly. To date, the designing of restraint systems in the frontal load case has focused primarily on front seat passengers. However, for passengers in the rear seat area increased loads also occur as a result of the subsequent rotational movement of the vehicle, in addition to the loads acting on the occupant as a result of forward momentum. Here, the problem frequently arises that following vehicle deceleration the head of the rear seat passenger strikes another occupant, the headrest or the C-pillar, and in the process may sustain significant injuries. The timing requirement of the restraint systems demanded here falls after the offset and speed of the collision, and later depending on the vehicle (in this case Euro NCAP).

Figure 4:
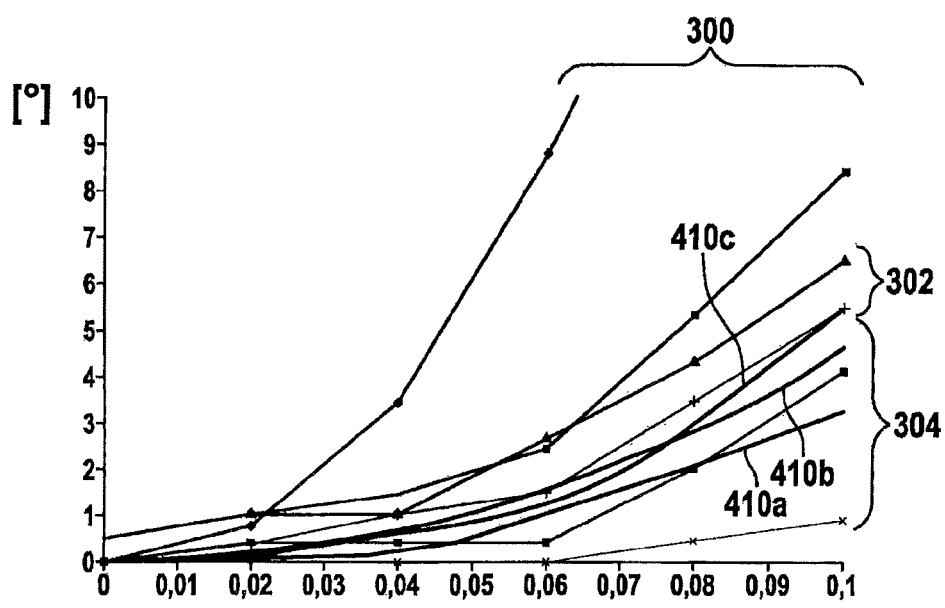
FIG. 4 shows a representation of a detail of the rotation curves in the time frame of 0 to 100 ms after the collision.

FIG. 4 shows a detailed representation from FIG. 3. Absolute rotations 300, 302, 304 of the vehicles mentioned in FIG. 3 are shown in the time frame of from 0 to 100 ms after a collision. Shown in addition to the vehicles previously shown in FIG. 3 are rotation curves 410a, 410b, 410c of three additional vehicles which include a reference yaw rate sensor. This sensor allows a measurement of the incremental yaw rate as well as the absolute rotation. From FIG. 4 it is apparent that in the time frame up to 100 ms after the collision, a rotation has already occurred sufficient for an algorithmic analysis in the vehicles tested. This is sufficient to promptly carry out a triggering and control of relevant restraint means for the further progression of the crash beyond 100 ms.

Figure 5:
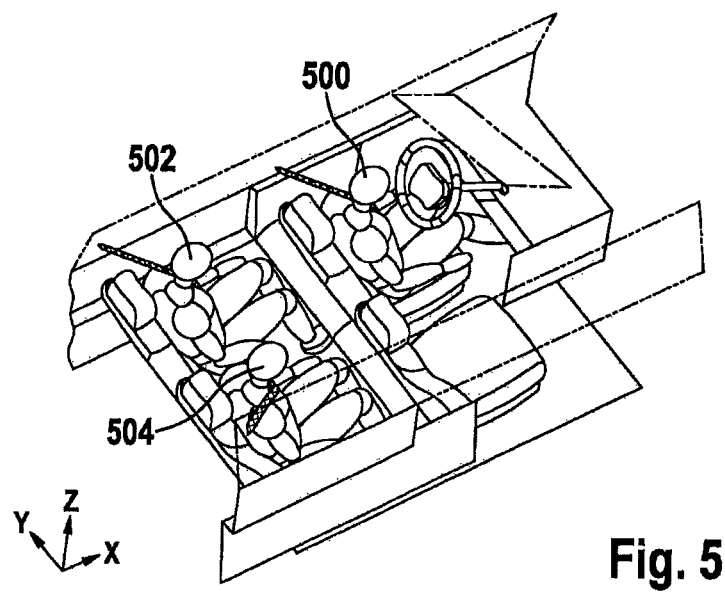
FIG. 5 shows a representation of an occupant simulation model of the vehicle interior for simulating a method for controlling according to one exemplary embodiment of the present invention for estimating the severity of injury of rear seat passengers.

FIG. 5 shows a representation of an occupant simulation of a vehicle interior with driver 500 and two rear seat passengers 502, 504. Outer panels and side windows of the vehicle are indicated. Occupants 500, 502, 504 of the vehicle are fastened to seats of the vehicle with restraint means. Driver 500 is sitting behind the steering wheel of the vehicle. Indicated in front of driver 500 is a driver windshield.

Figure 6:
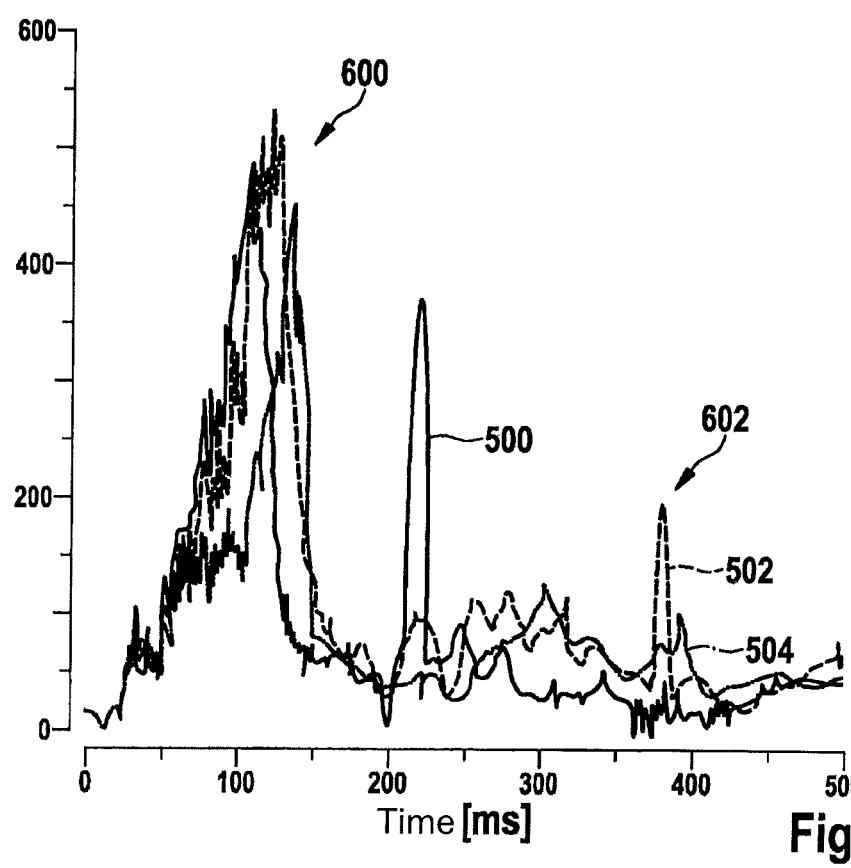
FIG. 6 shows a representation of resulting head accelerations in various places in an accident vehicle as the result of the occupant simulation.

FIG. 6 shows by way of example the head accelerations of driver 500 and two rear seat passengers 502, 504 from FIG. 5 during a 64 km/h Euro NCAP crash with 40% overlap. At approximately 110 ms, left rear seat passenger 502 experiences his main acceleration peak 600 from the forward movement and at approximately 380 ms after the collision another acceleration peak 602 due to his lateral movement as a result of the rotational movement of the vehicle. In this case, his head strikes the window or the side structure of the vehicle. The presently normal use of the safety belt and other restraint means is hardly capable of effectively preventing this type of occupant load. Compounding this is the fact that conventional safety belts (so-called 3-point seat belts) are asymmetrically designed. Thus, there is a closed side, in which the chest strap is guided past the neck and head to the upper deflection point, and an open side. Left rear seat passenger 502 and right rear seat passenger 504 are normally fitted with belts open toward the center of the vehicle. Thus, in the event of a collision with rotational elements, clearly different types of forces, in conjunction with the belt system, also act on the left and right side occupants. If both belts had the open side in the same direction, left and right rotating crash situations under otherwise identical conditions would differ accordingly in their effects on occupants 502, 504. This is, therefore, an equivalent effect.

Figure 7:
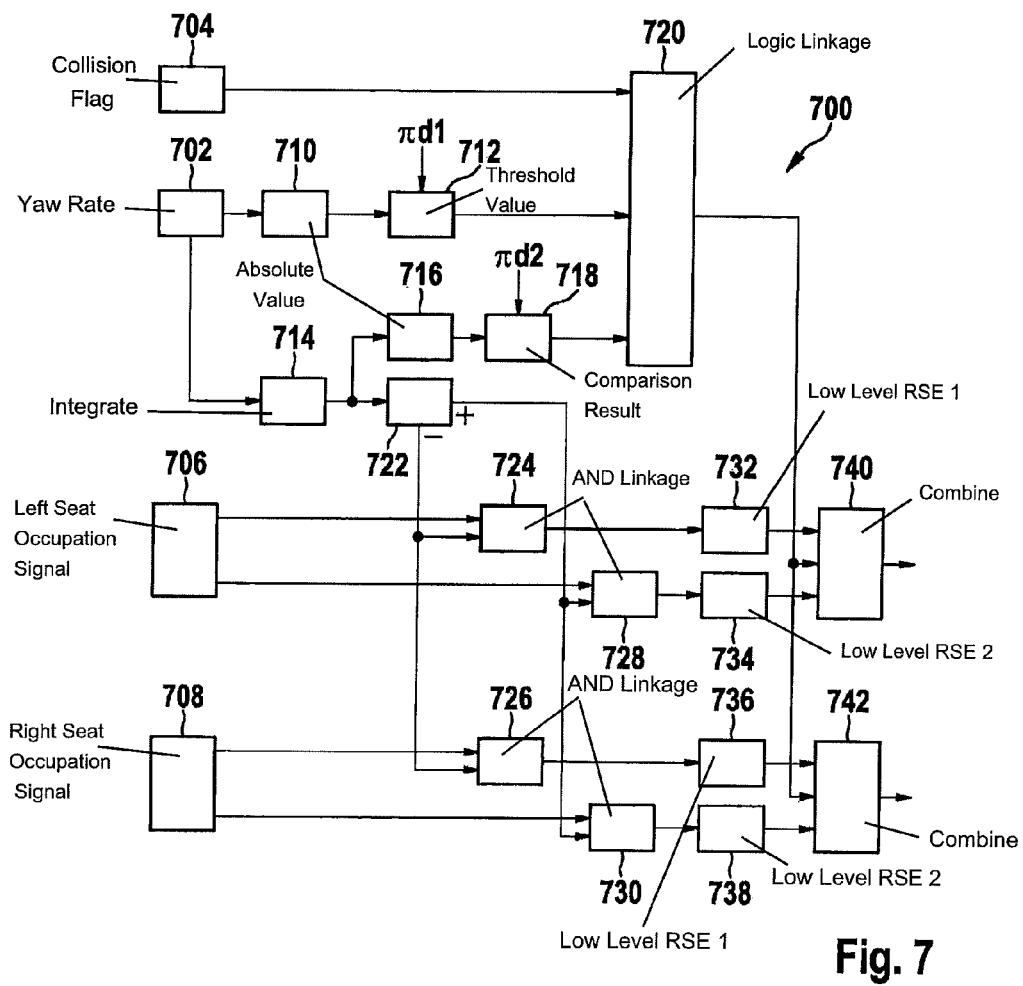
FIG. 7 shows a chart of a method for controlling an occupant protection means of a vehicle according to one exemplary embodiment of the present invention for belt load limiter control in the rear seat area.

FIG. 7 shows a chart of a method and a corresponding device 700 for controlling an occupant protection means of a vehicle according to one exemplary embodiment of the present invention. The vehicle may, for example, be the vehicle described with reference to FIG. 1a and method 700 may be implemented by device 110 shown in FIG. 1a.

A block 702 is shown for providing a yaw rate ωz, a block 704 for providing a collision flag which indicates that a collision has occurred, a block 706 for supplying a seat occupation signal which indicates the presence of a left rear seat passenger, and a block 708 for supplying a right seat occupation signal, which indicates the presence of a right rear seat passenger. Signals of blocks 702, 704, 706, 708 may be detected and supplied by suitable sensors.

In a block 710, the absolute value |ωz| of yaw rate ωz is formed from yaw rate ωz provided by block 702 and subjected to a threshold value comparison with a threshold value πd1 in a block 712. For example, it is checked in block 712 whether absolute value |ωz| is greater than threshold value πd1.

In a block 714, yaw rate ωz provided by block 702 is integrated, and from the integrated yaw rate an absolute value |ρ| of the integrated yaw rate is formed in a block 716, which is subjected to a threshold value comparison with a threshold value πd2 in a block 718. For example, it is checked in block 718 whether absolute value |ρ| is greater than threshold value πd2.

In a block 720 a logic linkage is carried out—in this case an AND linkage formed between the collision flag of block 704, a comparison result from block 712 and a comparison result from block 718. Thus, in block 720, it is checked whether a collision is present and whether the yaw rate and the totaled yaw rate each include a particular minimum value. From block 720 a signal is output which, depending on the result of the AND linkage, indicates either that an occupant protection means should be activated or should not be activated.

In a block 722 a sign VZ "−" or "+" of the yaw rate or of the yaw angle is ascertained from the integrated yaw rate of block 714. The sign indicates a direction of rotation of the vehicle. In this case, "−" stands for a rotation to the right and "+" for a rotation to the left.

In a block 724 an AND linkage is formed between the left seat occupancy signal of block 706 and a signal of block 722, which reproduces a negative sign "−" of the yaw rate or the yaw angle. Thus, in block 724 it is checked whether a rotation to the right is involved and a left rear seat occupant is present.

In a block 726 an AND linkage is formed between the right seat occupancy signal of block 708 and the signal of block 722, which reproduces the negative sign "−" of the yaw rate or the yaw angle. Thus, in block 726 it is checked whether a rotation to the right is involved and a right rear seat occupant is present.

In a block 728 an AND linkage is formed between the left seat occupancy signal of block 706 and the signal of block 722, which reproduces the positive sign "+" of the yaw rate or the yaw angle. Thus, in block 728 it is checked whether a rotation to the left is involved and a left rear seat occupant is present.

In a block 730 an AND linkage is formed between the right seat occupancy signal of block 708 and the signal of block 722, which reproduces the positive sign "+" of the yaw rate or the yaw angle. Thus, in block 730 it is checked whether a rotation to the left is involved and a right rear seat occupant is present.

In a block 732 a result of block 724 is linked to a low level "RSE 1" for the rear seat occupant to the left. The level may be a force level of a restraint system.

In a block 734 a result of block 728 is linked to a high level "RSE 2" for the rear seat occupant to the left.

In a block 736 a result of block 726 is linked to the low level "RSE 1" for the rear seat occupant to the right.

In a block 738 a result of block 730 is linked to the high level "RSE 2" for the rear seat occupant to the right.

In a logic 740 the RSE 1 level for the rear seat occupant to the left from block 732 and the RSE 2 level for the rear seat occupant to the left from block 734 are combined with a result of block 720. If the signal of block 720 indicates that an occupant protection system is to be activated and a left rear seat passenger is situated in the vehicle, then the occupant protection means provided for the left rear seat occupant is triggered either with the low level "RSE 1" or with the high level "RSE 2," depending on the result of the AND linkages of blocks 724, 728.

In a logic 742 the RSE 1 level for the rear seat occupant to the right from block 736 and the RSE 2 level for the rear seat occupant to the right from block 738 are combined with the result of block 720. If the signal of block 720 indicates that an occupant protection system is to be activated and a right rear seat passenger is situated in the vehicle, then the occupant protection means provided for the right rear seat occupant is triggered either with the low level "RSE 1" or with the high level "RSE 2," depending on the result of the AND linkages of blocks 726, 730.

Method 700 is explained below with reference to one exemplary embodiment of a belt load limiter control in the rear seat area of the vehicle. Provided as input signals, in addition to yaw rate (ωz) 702, is also a piece of information about a collision, a so-called crash flag 704. The state variable crash flag 704 having the options 0 or 1 indicates whether or not a collision has taken place. Normally, this value is at "1" until no later than 50 ms after a collision. In addition, a piece of information 706, 708 relating to the occupant from the rear seat area is also available. Newer vehicle models either query the state of the belt or in addition capture information about the seat occupancy detection in order to obtain information 706, 708. Once the collision has taken place, yaw rate 702 is initially integrated 714 or summed up in a first processing step. From this the angle of rotation about the vertical axis phi is calculated. In a further processing step, the integrated yaw rate is supplied to an absolute value function 716 and a sign ascertainment function 722. The result is, for one, the absolute value of the angle phi and therefore the piece of information regarding whether it is a rotation to the left or right about the vehicle vertical axis (Definition: rotation to the left is classified as "+," rotation to the right is classified as "−"). Next, the absolute value of the angle and the absolute value of the yaw rate are subjected to a threshold value comparison 712, 718. In a further step, the results of the queries and of the piece of information about a collision are fed to a logic 720, in this case a logic AND linkage. The piece of information about the direction of rotation left/right is then compared in a further processing step with the piece of information about the rear seat occupants. In a simple logic, in this case the AND linkage 728, it is compared whether a rear seat occupant is situated to the left and a rotation to the left is present. If this is the case, corresponding force levels are activated for the left and right belt systems. In the case of the left rear seat occupant and rotation to the left, this would be 734 RSE level 2, e.g. for setting a higher belt load, so that the occupant is more securely fastened. In contrast, the RSE level 1 is activated for the right rear seat occupant 738, which means, for example, a lower force level, so that the belt may be further extended to minimize the loads on the occupant. In a further step, the result of comparisons 732, 734, 736, 738 are combined via a simple logic 740, 742 and linked to the result from the comparison collision flag and threshold value query 720 in order to avoid an unnecessary activation.

In an expanded method according to another exemplary embodiment of the present invention, several RSE levels may be set as a function of the angle and the yaw rate in order to achieve a chronological and dynamic adaptation of RSE components. In addition, a modulated belt load adjustment beyond the belt load level may be adapted as a function of the crash curve (given or calculated from sensor data), or adaptation of the desired belt load curve as a function of the individual characteristics of the person to be protected (age, bone density, size or other individual features). Such a system therefore allows an advantageous application with respect to the individualization of the protection systems in the rear seat area. For example, a shorter occupant in the rear seat area has significantly greater freedom of movement than a very tall occupant. With increasing freedom of movement, more ride down space is available which should be optimally utilized by an optimal control in order to minimize the severity of injury. Additional advantages result when combined with the use of child car seats, as is usual in the rear seat area. Thus, the kinematics influenced by the child car seat alone of children sitting in the rear seat may be additionally influenced.

The exemplary embodiments described and shown in the figures are selected only by way of example. Different exemplary embodiments may be combined completely with one another or with respect to individual features. An exemplary embodiment may also be supplemented by features of another exemplary embodiment. Moreover, method steps according to the present invention may be repeated as well as implemented in a sequence different from that described.

What is claimed is:

1. A method for controlling an occupant protection arrangement that includes at least two levels of protection for an occupant of a vehicle, the method comprising:
    determining, by processing circuitry and using a yaw rate sensor, a yaw direction of the vehicle;
    identifying, by the processing circuitry, a presence of at least one of (i) a left rear occupant of the vehicle and (ii) a right rear occupant of the vehicle, and determining, by the processing circuitry, a respective lateral movement space available in the vehicle for the at least on of (i) the left rear occupant and (ii) the right rear occupant;
    selecting, by the processing circuitry, one of the at least two levels of protection of the occupant protection arrangement as the level to be used for the at least one of (i) the left rear occupant and (ii) the right rear occupant in the event of an impact of the vehicle based on the yaw direction of the vehicle and the lateral movement space determined to be available in the vehicle for the at least one of (i) the left rear occupant and (ii) the right rear occupant; and
    controlling, by the processing circuitry, the occupant protection arrangement to provide a protection at the selected level to the at least one of the (i) the left rear occupant and (ii) the right rear occupant during the impact.

2. The method as recited in claim 1, wherein the lateral movement space available is ascertained using a piece of information about the at least one of (i) the left rear occupant and (ii) the right rear occupant.

3. The method as recited in claim 1, further comprising:
    detecting a type of protection of the at least one of (i) the left rear occupant and (ii) the right rear occupant, the lateral movement space available being ascertained using the type of protection.

4. The method as recited in claim 1, wherein a higher one of the levels of protection is selected if the lateral movement space available is less than a minimum value than otherwise.

5. The method as recited in claim 1, further comprising:
    reading in at least one piece of information about the at least one of (i) the left rear occupant and (ii) the right rear occupant, the level of protection to be used being ascertained in the step of selecting using the piece of information about the at least one of (i) the left rear occupant and (ii) the right rear occupant.

6. The method as recited in claim 1, wherein the level of protection to be used is selected using a yaw angle of the vehicle.

7. The method as recited in claim 1, wherein:
    the occupant protection arrangement includes at least one of: a restraint belt, a seat, a restraint system integrated into the seat, an energy absorbing interior body, an energy absorbing panel, and an airbag; and
    the at least two levels of protection represent at least two different tensile force levels of the restraint belt.

8. The method as recited in claim 7, wherein the occupant protection arrangement is in a rear seat area of the vehicle.

9. A control unit for carrying carry out a method for controlling an occupant protection arrangement that includes at least two levels of protection for an occupant of a vehicle, the method comprising:
    determining, using a yaw rate sensor, a yaw direction of the vehicle;
    identifying, by the processing circuitry, a presence of at least one of (i) a left rear occupant of the vehicle and (ii) a right rear occupant of the vehicle, and determining, by the processing circuitry, a respective lateral movement space available in the vehicle for the at least one of (i) the left rear occupant and (ii) the right rear occupant;
    selecting one of the at least two levels of protection of the occupant protection arrangement as the level to be used for the at least one of (i) the left rear occupant and (ii) the right rear occupant in the event of an impact of the vehicle based on the yaw direction of the vehicle and the lateral movement space determined to be available in the vehicle for the at least one of (i) the left rear occupant and (ii) the right rear occupant; and
    controlling the occupant protection arrangement to provide a protection at the selected level to the at least one of (i) the left rear occupant and (ii) the right rear occupant during the impact.

10. A computer program product having program code that when executed on a device carries out a method for controlling an occupant protection arrangement that includes at least two levels of protection for an occupant of a vehicle, the method comprising:
    determining, using a yaw rate sensor, a yaw direction of the vehicle;
    identifying a presence of at least one of (i) a left rear occupant of the vehicle and (ii) a right rear occupant of the vehicle, and determining, by the processing circuitry, a respective lateral movement space available in the vehicle for the at least one of (i) the left rear occupant and (ii) the right rear occupant;

selecting one of the at least two levels of protection of the occupant protection arrangement as the level to be used for the at least one of (i) the left rear occupant and (ii) the right rear occupant in the event of an impact of the vehicle based on the yaw direction of the vehicle and the lateral movement space determined to be available in the vehicle for the at least one of (i) the left rear occupant and (ii) the right rear occupant; and controlling the occupant protection arrangement to provide a protection at the selected level to the at least one of (i) the left rear occupant and (ii) the right rear occupant during the impact.

* * * * *